United States Patent [19]

Silbermann et al.

[11] Patent Number: 5,340,862

[45] Date of Patent: Aug. 23, 1994

[54] STABILIZERS FOR HALOGEN CONTAINING POLYMERS

[75] Inventors: Joseph Silbermann, Old Bridge; William L. Smith, Basking Ridge, both of N.J.

[73] Assignee: Elf Atochem North America, Inc., Pa.

[21] Appl. No.: 19,322

[22] Filed: Feb. 10, 1993

Related U.S. Application Data

[63] Continuation of Ser. No. 681,615, Mar. 28, 1991, abandoned, which is a continuation of Ser. No. 528,262, May 24, 1990, abandoned, which is a continuation of Ser. No. 398,293, Aug. 23, 1989, abandoned, which is a continuation of Ser. No. 256,003, Oct. 7, 1988, abandoned.

[51] Int. Cl.$^5$ ............................................. C08K 5/57
[52] U.S. Cl. ........................................... 524/178; 524/417; 524/180; 524/181; 252/400.1
[58] Field of Search .............. 252/400.1; 524/417, 524/178, 180, 181

[56] References Cited

U.S. PATENT DOCUMENTS

| | | | |
|---|---|---|---|
| 2,160,061 | 5/1939 | Doolittle | 524/417 |
| 2,218,645 | 10/1940 | Japs | 524/417 |
| 2,408,258 | 9/1946 | Hetzel et al. | 423/307 |
| 2,499,503 | 3/1950 | Huff et al. | 524/417 |
| 2,507,142 | 5/1950 | Chaban | 524/417 |
| 2,597,987 | 5/1952 | Harding | 524/417 |
| 2,809,956 | 10/1957 | Mack | 260/45.75 |
| 2,868,765 | 1/1959 | Haefner et al. | 524/178 |
| 3,063,962 | 11/1962 | Wooten et al. | 260/45.75 |
| 3,167,527 | 1/1965 | Hechenbleikner | 260/45.75 |
| 3,607,166 | 12/1962 | Zaremsky | 260/45.75 |
| 3,715,333 | 2/1973 | Larkin | 260/45.75 |
| 3,890,277 | 6/1975 | Kugele et al. | 260/45.75 |
| 3,894,989 | 7/1975 | Collins et al. | 260/45.75 |
| 3,919,168 | 11/1975 | Dieckmann | 524/177 |
| 3,943,099 | 3/1976 | Bakassian et al. | 260/45.75 |
| 4,029,618 | 6/1977 | Dieckmann | 260/23 XA |
| 4,062,881 | 12/1977 | Kugele | 260/399 |
| 4,111,903 | 9/1978 | Hock et al. | 260/45.75 |
| 4,118,371 | 10/1978 | Kugele | 260/45.75 |
| 4,122,064 | 10/1978 | Shceidl et al. | 260/45.75 |
| 4,255,320 | 3/1981 | Brecker et al. | 260/45.75 |
| 4,274,099 | 6/1981 | Burley et al. | 260/45.75 |
| 4,314,934 | 2/1982 | Smith et al. | 260/45.75 |
| 4,345,040 | 8/1982 | Hall | 524/417 |
| 4,374,205 | 2/1983 | Hall | 524/417 |
| 4,515,916 | 5/1985 | Molt | 524/99 |
| 54,576,484 | 3/1986 | Bresser et al. | 524/182 |
| 4,711,921 | 12/1987 | Lehr | 524/417 |
| 4,965,304 | 10/1990 | Bethea | 524/417 |
| 5,013,782 | 5/1991 | Tateno | 524/417 |

FOREIGN PATENT DOCUMENTS

| | | |
|---|---|---|
| 0177784 | 10/1984 | European Pat. Off. . |
| 0481325 | 10/1990 | European Pat. Off. . |
| 1265409 | 6/1959 | Fed. Rep. of Germany . |
| 694474 | 7/1953 | United Kingdom . |
| 1001344 | 8/1965 | United Kingdom . |
| 1321157 | 7/1971 | United Kingdom . |

OTHER PUBLICATIONS

Abstract J8 7024453-B; *Polymer & General Chemistry*; vol. 87, No. 23, p. 2, 1987.

Developments In Polymer Stabilization-4 Edited by Gerald Scott, Applied Science Publishers LTD London pp. 23-69.

*Primary Examiner*—Veronica P. Hoke
*Attorney, Agent, or Firm*—Stanley A. Marcus

[57] ABSTRACT

Improved stabilizer compositions are provided which impart significant long-term stabilization to halogen containing polymers such as polyvinyl chloride. The improved stabilizer compositions incorporate an alkali-metal hydrogen phosphate compound, such as anhydrous disodium hydrogen phosphate, of a predetermined surface area. The novel inorganic phosphate enables a reduction in the amount of organmetallic stabilizer, if desired, while still yielding long-term stability in the resultant polymer, or the ability to raise process temperature and reduce cycle times of molding operations.

35 Claims, No Drawings

STABILIZERS FOR HALOGEN CONTAINING POLYMERS

This application is a continuation of copending application Ser. No. 07/681,615, filed on Mar. 28, 1991, now abandoned, which is a continuation of application Ser. No. 07/528,262, filed May 24, 1990, now abandoned, which is a continuation of application Ser. No. 07/398,293, filed Aug. 23, 1989, now abandoned, which is a continuation of application Ser. No. 07/256,003, filed Oct. 7, 1988, now abandoned.

BACKGROUND OF THE INVENTION

Many Halogen containing polymers and copolymers are thermoplastic in nature, and, therefore, require heating in order to soften them during fabrication operations such as molding, calendering, and extruding. The heat with which these polymers are processed is usually in the range of 190° C. and is limited in degree and duration by their tendency to deteriorate and decompose. Decomposition of the polymers leads to deterioration of the resultant physical properties of the resin. In addition, a severe darkening in color of the resin results which prohibits its use in lightly colored or transparent articles. This deterioration and decomposition is a major drawback to the use of polyvinyl chloride resins in many applications, and in order to overcome this drawback several products have been proposed as stabilizers for halogen containing vinyl polymers. In general, the stabilizers fall into three main classes, namely, metal soaps, organic chemicals, and organometallic compounds.

It has been characteristic of prior art stabilizing systems that they may not fully prevent the deterioration of resins or polymers, including polyvinyl chloride, during the period when the resins and stabilizer compositions may be heated during processing. During this period, which may be from 5 to 30 minutes or longer, the various ingredients including e.g. pigment, plasticizer, stabilizer, lubricant, etc. may be mixed with the resin and the mixture subjected to the influence of heat and pressure to form a substantially homogeneous mixture. During this period of severe heating (T=190° C. or greater), the resin may deteriorate much more quickly than under normal processing or handling conditions, thereby shortening the period that the resin mixture can be heated.

In injection molding processes, heated resin compositions are injected into molds. In general, viscosity of the resin composition drops as temperature increases; thus, it is possible to reduce the cycle times of injection molding processes by increasing the temperature of the resin composition. Thus, it would be useful to be able to raise the processing temperatures of injection molding and other processes.

Organotin compounds, particularly those having tin bonded to sulfur, such as those which contain a mercapto group, have been found to be an extremely effective type of stabilizer for halogen containing polymers, such as vinyl chloride polymers. These organotin stabilizers are relatively expensive. As a result, it would be desirable to replace at least a portion of the tin present in a given resin formulation with a less expensive material without incurring any significant decrease in heat stability. In addition, it is desirable to enhance the stabilizing properties of less efficient organotin compounds by addition of inexpensive synergistic additive compounds. It is also desirable to obtain longer process times at elevated temperatures and to be able to process resin formulations at higher temperatures.

The use of phosphate materials as primary stabilizers for vinyl polymers was disclosed in U.S. Pat. Nos. 2,218,645 and 2,868,765.

U.S. Pat. No. 2,218,645 teaches that a metal phosphate can be used as a primary stabilizing compound. Lead or alkali-metal salts of oxyacids of boron and phosphorous are used as primary stabilizers. The resultant compositions are claimed to exhibit some color improvement.

U.S. Pat. No. 2,868,765 relates to heat stabilized vinyl chloride resin compositions. A phosphate is uniformly distributed on the surfaces of polymer particles by contacting the polymer particles with an aqueous solution of the phosphate; the treated polymer is then combined with other heat stabilizing compounds.

In general, the prior art disclosure of the utilization of an inorganic phosphate as a stabilizing component of vinyl halide polymer compositions did not recognize the importance of surface area as a determinant of performance. It has now been found that surface area is what enables superior melt viscosity times to be obtained with inorganic phosphates previously thought to be ineffective.

An objective of this invention is to extend the viscosity stability of halogen containing resins, such as polyvinyl chloride, at elevated temperatures, while delaying for as long as possible the development of discoloration.

One aspect of this invention is to reduce the amount of organometallic stabilizer required to achieve a given degree of heat stabilization.

A second aspect of this invention is to improve the performance of less efficient stabilizer compounds by the addition of synergistic additive compounds.

Another objective is to provide novel stabilizer compositions for halogenated vinyl resins and novel processes for stabilizing such resins.

Briefly stated, the invention comprises vinyl halide resins, and, as a stabilizer, an organometallic compound, or a derivative thereof and a finely-divided anhydrous or hydrous sodium or potassium monohydrogen phosphate, lithium dihydrogen phosphate, or an alkali metal pyrophosphate. The addition of the finely divided phosphate results in improved stabilization, namely improved melt viscosity times, of the resultant vinyl resin composition. The new stabilizer composition, which includes the synergistic additive, provides enhanced melt stability in comparison to vinyl compounds using the same organometallic stabilizer compounds.

A preferred halogen-containing thermoplastic resin which exhibits superior melt stabilization is polyvinyl chloride, although also contemplated are other polyvinyl halide polymers, copolymers with vinyl acetate, vinylidene chloride, styrene dialkyl fumarate or maleate, or other alkyl esters of mono-olefinic acids, as well as blends and alloys of vinyl halide polymers with other thermoplastic resins. The polyvinyl halide polymer used is ordinarily and preferably the chloride, although others such as the bromide or flouride may be used. Also included are chlorinated polyvinyl chloride and halogenated polyolefins.

SUMMARY OF THE INVENTION

It has been discovered that the following objects and others can be achieved from novel synergistic stabilizer compositions. These novel compositions comprises a) an organometallic compound, and
b) a finely divided anhydrous or hydrous sodium or potassium monohydrogen phosphate, lithium dihydrogen phosphate, or an alkali metal pyrophosphate.

The organometallic compounds useful within the scope of the present invention include the well-known, widely described compounds and mixtures of compounds used as stabilizers for polyvinyl chloride. These compounds can be selected from organometallic compounds where the metal is lithium, sodium, potassium, magnesium, calcium, zinc, strontium, cadmium, barium, manganese, iron, cobalt, titanium, aluminum, tin, lead, bismuth or antimony, or a mixture of any two or more such organometallic compounds. The use of many of these organometallic compounds as PVC stabilizers is described in British Patent Specification 1,001,344 and an article by Robert G. Weiler, "Uncommon Metals as Heat Stabilizers for Flexible Vinyl", pages 534–537, Volume 28, Technical Papers, Society of Plastics Engineers, Inc, 1982, the teachings of which are incorporated herein by reference.

The use of sulfur containing antimony compounds as stabilizers for vinyl halide polymers is disclosed in U.S. Pat. No. 4,029,618; that disclosure is incorporated herein by reference.

The organotin compounds represent an especially well-known and widely used class of stabilizers for vinyl halide polymers. Included within the class of useful organotin compounds are those containing one or more tetravalent tin atoms which each have at least one direct tin to carbon bond. Such compounds are described in the following U.S. patents, whose disclosures are incorporated herein by reference:

| | |
|---|---|
| 3,640,950 | Weisfeld |
| 3,758,537 | Wowk |
| 3,758,834 | Wowk |
| 3,810,868 | Weisfeld et al |
| 3,887,519 | Weisfeld et al |
| 3,894,989 | Collins et al |
| 4,360,619 | Kugele |

Another important and widely used class of organotin compounds are those containing one or more tetravalent tin atoms which each has at least one direct tin to sulfur or tin to oxygen bond, i.e., which contains the group:

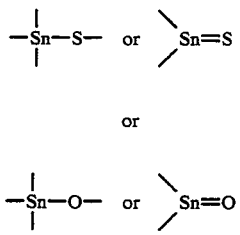

Compounds falling within this class of compounds are described in the following patents; their disclosure is incorporated by reference herein:

| U.S. Pat. Nos. | |
|---|---|
| 2,809,956 | Mack |
| 3,063,963 | Wooten et al |
| 3,067,166 | Zaremsky |
| 3,167,527 | Heckenbleikner et al |
| 3,413,264 | Heckenbleikner et al |
| 3,442,806 | O'Neill |
| 3,483,159 | Kauder |
| 3,503,924 | Pollock |
| 3,507,827 | Pollock |
| 3,534,121 | Eggensperger |
| 3,542,825 | Haye |
| 3,565,931 | Brecker |
| 3,640,950 | Weisfeld |
| 3,674,737 | Brecker |
| 3,758,341 | Wowk |
| 3,758,536 | Wowk |
| 3,758,537 | Wowk |
| 3,810,868 | Weisfeld et al |
| 3,887,519 | Weisfeld et al |
| 3,890,277 | Kugele et al |
| 3,894,989 | Collins et al |
| 3,928,285 | Gough et al |
| 3,943,099 | Bokassian et al |
| 3,970,678 | Molt |
| 3,979,359 | Kugele et al |
| 4,062,881 | Kugele |
| 4,111,903 | Hoch et al |
| 4,118,371 | Kugele |
| 4,122,064 | Scheidl et al |
| 4,254,017 | Dworkin et al |
| 4,274,999 | Burley et al |
| 4,314,934 | Smith et al |
| 4,360,619 | Kugele et al |

| U.K. Patents |
|---|
| 874,574 |
| 1,117,652 |

The organotin compounds can be used alone or in combination, in the form of mixtures that react in situ, as described in U.S. Pat. No. 3,674,737 to Brecker, in the form of mixtures as described in U.S. Pat. No. 4,255,320 to Brecker and as blends as described in U.S. Pat. No. 4,576,984 to Bresser et al, the disclosures of which are all incorporated by reference herein.

In addition, the organotin compounds, mixtures, blends and the like referred to above can be used in combination with an organotin halide as disclosed by Larkin in U.S. Pat. No. 3,715,333, by Kugele in U.S. Pat. No. 4,360,619 and by Ciba-Geigy Corp. in British Patent Specification 1,321,157; these disclosures are also incorporated herein by reference.

The alkali-metal monohydrogen phosphate salt is preferably a sodium salt and, when an anhydrous sodium monohydrogen phosphate salt is used, it preferably has a B.E.T measured surface area greater than about 0.5 m$^2$/g. The anhydrous lithium phosphate salt and the anhydrous potassium monohydrogen phosphate salt have been found to be effective at B.E.T measured surface areas below 0.5 m$^2$/g. Particularly enhanced improvements in performance are seen when the phosphate salt has a surface area above about 1.1 m$^2$/g.

The B.E.T. technique for the determination of surface area of a powdered solid is a measure of the quantity of gas that absorbs as a monomolecular layer on the sample. This absorption is carried out at or near the boiling point of the absorbate. The surface area of the sample can be calculated from the number of absorbed molecules. The solid should be completely desorbed of any volatile material prior to the test. All measurements of surface area were made on the Micromeritics Flowsorb II 2300 instrument using a single point determination technique with nitrogen gas at the absorbate. The accuracy of the measurement is ±3%.

In general, the vinyl halide polymer compositions that can be stabilized according to this invention will be homopolymers of vinyl halide monomers, copolymers of vinyl halide monomers with other monomers and including both block and graft copolymers, and alloys, blends and mixtures of vinyl halide monomers with other polymers. The vinyl halide polymers can be compounded for extrusion, injection molding and blow molding, and can be formed into such finished articles as fibers, siding, window profiles, films, pipe, elbows and other pipe couplings, and bottles. The vinyl halide polymers can be mixed with other ingredients such as dyes, pigments, flameproofing agents, lubricants, impact modifiers and processing aids, and with other additives to prevent, reduce or mask discoloration or deterioration caused by heating, aging, exposure to light or weathering.

DETAILED DESCRIPTION OF THE INVENTION

The Metal Containing Stabilizer

The metal-containing stabilizers useful herein are well-known for their ability to prevent formation of, or react with and neutralize, the hydrogen halide evolved when vinyl halide polymers are heated to processing temperatures. The progressive elimination of hydrogen halide from the polymerization chain ("unzipping") yields a polyene chain which is believed to be at least partially responsible for the change in viscosity and color that occurs during heating of the polymer.

As indicated, these conventional, well-known metal-containing heat stabilizers for vinyl halide polymers include compounds of the elements of groups IIA and IIB of the Periodic Table of the Elements, as well as compounds of tin, lead, bismuth and antimony (trivalent). Conventional well-known heat stabilizers for vinyl chloride polymers are also discussed in Chapter 9 of the Encyclopedia of PVC, edited by L. I. Nass (M. Dekker, New York, 1976), incorporated herein by reference. More generally used metals are calcium, barium, zinc, tin and trivalent antimony.

One class of metal compounds that is particularly effective comprises those containing one or more tetravalent tin atoms which each have at least one direct tin to carbon bond and wherein the remaining valences of the tin atom are satisfied by bonds to halogen, oxygen, phosphorous, boron, and/or sulfur and/or a residue resulting from 1) removal of the hydrogen atom from the oxygen atom of a carboxylic acid, an alcohol or a polyol; or
2) removal of the hydrogen atom from the sulfur atom of a mercaptan, mercaptoacid, mercaptoalcohol, mercaptoacid ester or mercaptoalcohol ester.

Oxygen may or may not be present; when present, it is typically bonded to one or more of tin, carbon, hydrogen and phosphorus.

The well-known members of this class are those containing one or more tetravalent tin atoms which each has at least one direct tin to sulfur or tin to oxygen bond and include the organotin oxides, sulfides, alkoxides, carboxylates, mercaptides, derivatives of mercaptoacids, derivatives of mercaptoalcohols and the mercaptoacid and mercaptoalcohol esters. They can be presented by the formulae $(R^4SnZ_{1.5})_x$
$(R^4)_2SnZ$
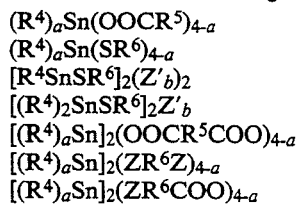

where
a is 1 or 2;
x is an integer from 3 to 20, inclusive;
Z is oxygen or sulfur;
Z' is oxygen or sulfur;
b is an integer from 1 to 4 when Z' is sulfur and is 1 when Z' is oxygen;
$R^4$, $R^5$ and $R^6$ each independently is substituted or unsubstituted hydrocarbyl, and $R^6$ additionally can be $-R^7-COOR^8$ or $-R^9-OOCR^8$
where $R^7$ is $C_1-C_{20}$ alkylene, or $R^6$ can be H or $R^9$;
$R^8$ is hydrocarbyl; and
$R^9$ is $C_2-C_{20}$ alkylene.

The metal-containing compound, in one well-known embodiment, comprises the reaction product of a mono-organotin trihalide, a diorganotin dihalide or mixture thereof with an alkali metal sulfide and one or more of a monocarboxylic acid, a polycarboxylic acid, a mercaptan, a mercaptoacid, a mercaptoalcohol, a mercaptoacid ester and a mercaptoalcohol ester.

Representative tin compounds that are used include
dibutyltin maleate
dibutyltin di(stearyl maleate)
[monobutyltin(isooctylmercaptoacetate)sulfide]
monobutyltin(dodecylmercaptide)sulfide
monobutyltin (mercaptoethyloleate)sulfide
monobutyltin trimercaptoethyloleate
monobutyltin(tri(hydroxyethylmercaptide) (sulfide)
[monobutyltin(mercaptoethyloleate)(sulfide)]
and bridged sulfur compounds of formula

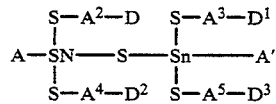

where
A and $A^1$ are alkyl of 1 to 12 carbon atoms, such as methyl, butyl and octyl,
$A^2$, $A^3$, $A^4$ and $A^5$ are lower alkylene such as ethylene,
D, $D^1$, $D^2$ and $D^3$ each independently, is

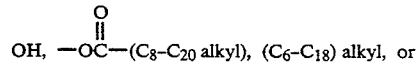

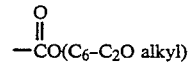

or

D and $D^1$, or $D^2$ and $D^3$ together can form the group

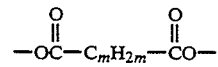

where m is a number from 0 to 8.

Excellent results in stabilizing vinyl halide resins are obtained when stabilizers other than those based on tin are used. Systems such as those derived from alkali metal (sodium, potassium), alkaline earth metals (calcium, barium) and other metals, such as magnesium, zinc, stannous tin, lead, antimony or their mixtures or with various other additives are particularly suitable. These additives can be in particular the beta-diketones, epoxides, such as, for example epoxidized soya oil, phosphites, phosphonates, triphenyl phosphites and antioxidants such as tert-butyl catechol and others. Thus, there can be used barium, strontium, calcium, cadmium, zinc, lead, tin, magnesium, cobalt, nickel, titanium and aluminum salts of phenols, aromatic carboxylic acids, fatty acids or epoxy fatty acids.

Examples of suitable salts included barium di(nonylphenolate), strontium di(nonylphenolate), strontium di(amylphenolate), barium di(octylphenolate), strontium di(octylphenolate), barium di(nonyl-o-cresolate), lead di(octylphenolate), cadmium-2-ethyl hexoate, cadmium laurate, cadmium stearate, zinc caprylate, cadmium caprate, barium stearate, barium-2-ethylhexoate, barium laurate, barium ricinoleate, lead stearate, aluminum stearate, magnesium stearate, calcium octoate, calcium stearate, cadmium naphthenate, cadmium benzoate, cadmium p-tert-butylbenzoate, barium octyl salicylate, cadmium epoxy stearate, strontium epoxy stearate, cadmium salt of epoxidized acids of soybean oil, and lead epoxy stearate.

The metal-containing compound can be the barium, calcium, lead, magnesium, potassium, tin (including $Sn^{++}$) or zinc salt of a carboxylic acid, a phenol, sulfuric acid or phosphoric acid. When using alkali or alkaline earth metals and/or zinc, the metal derivatives which are particularly suitable are the carboxylates. Reference can be made in a non-limitative matter to the laurate, stearate, benzoate, caproate, caprylate, 2-ethylhexanoate, naphthenate, neoalkanoate and oleate. However, a certain number of derivatives such as the carbonate, oxide and sulphate can also be advantageously used.

When antimony is chosen as the metal, useful results are obtained when the mercapto esters are employed in conjunction with antimony trimercaptides, these trimercaptides being derived desirably from aliphatic mercaptans, esters of mercapto-acids or esters of mercapto-alkyls.

The metal-containing stabilizer component can be a single compound or can be a combination of compounds. The metal-containing stabilizer component will generally be present in an amount to provide from about 0.1 to 2 parts of stabilizer per 100 parts of polymers; lead is typically used in greater amounts, as high as 2 to 4 parts of lead stabilizer per 100 parts of resin.

The tin stabilizer components of one embodiment of the present stabilizer compositions can be broken down into four major categories. Other conceivable tin stabilizers would also work effectively in the present invention.

Grouping I of the tin stabilizer compounds are sulfide containing tin mercaptide-type stabilizer. These compounds will contain the

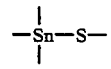

group as described on page 6 hereinabove. The stabilizer used must be substantially non-volatile at ordinary temperatures, namely, 190° C., and dispersible in the selected vinyl resin, that is, compatible to the extent that it may be compounded with the resin in compounding operations that are usual in this industry. Examples of the stabilizers which meet these general requirements and that are used are those which fall under the first category, sulfide containing mercaptides, such as alkylated tins (C-1 to C-18 individually and in combination), ester tins individually and in combination, and non-alkylated tins.

The second major grouping of tin stabilizers is bridged mercaptide compositions. Compositions which are usually designated as bridged mercaptides are those such as sulfide bridge tins, oxygen bridged tins, and halogen containing tins.

The third major grouping of tin stabilizers are non-sulfur stabilizing compounds where tin is bonded to oxygen. These compounds contain the

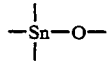

group as described on page 6 hereinabove. Types of non-sulfur compounds which are utilized as excellent stabilizing materials alone, or in combination, are tin carboxylates, tin maleates, or tin alkoxides.

The fourth major grouping of tin stabilizer compositions are combinations of any of the above three identified categories. The combinations can be constructed in such a fashion so as to individually place the stabilizers together or to actually form a compound constructed of two or more of the above-identified stabilizing compounds.

The tin stabilizer compound performs the function of preventing decomposition of the polymer during the processing procedure. The stabilizer allows the polymer itself to be molded, calendered or extruded without any type of discoloration or deterioration of the resin itself.

A major disadvantage of the use of any of the above-identified organotin stabilizer compositions is the prohibitive cost associated therewith. A reduction of the amount of actual tin stabilizer would be extremely beneficial in that it will make the use of such stabilizing compounds or compositions a major cost-saving feature for the user. In addition, longer term stability of standard amounts of tin stabilizers would also be extremely useful.

The Alkali-Metal Phosphate Compound

To produce the stabilizer according to the invention, an alkali-metal monohydrogen phosphate salt or alkali-metal pyrophosphate is added along with, the organometallic stabilizer composition. Use of the alkali-metal monohydrogen phosphate salt or or alkali-metal pyrophosphate can lower the cost of the organometallic stabilizer material or enhance an otherwise mediocre stabilizer material and extend the term stability of the polyvinyl chloride polymer resin. Because of low cost and ready availability, a particularly preferred group of alkali-metal monohydrogen phosphate compounds, is a group of disodium hydrogen phosphates ($Na_2HPO_4.7H_2O$, $Na_2HPO_4.2H_2O$, $Na_2HPO_4$ (anhydrous), etc.). As indicated, they can be added in partially hydrated or in anhydrous form.

A second group of alkali-metal phosphates are the dipotassium monohydrogen phosphates and the lithium dihydrogen phosphates. Both groups act as a synergist when added to a selected organmetallic stabilizer.

Thirdly, alkali-metal pyrophosphates such as $Na_4P_2O_7$, $Na_4P_2O_7 \cdot 10H_2O$, $K_4P_2O_7$ all exhibit synergistic qualities when added to an organometallic stabilizer.

The monohydrogen phosphate compounds can be simply expressed by the formula:

$$Me_2HPO_4$$

where Me is Na or K.

Additionally, the lithium analog can be represented by $LiH_2PO_4$.

The addition of one or more of these alkali-metal monohydrogen phosphate salts or a alkali-metal pyrophosphates to a given concentration of one or more of the organometallic stabilizer compounds considerably improves the degree of stabilization imparted to the vinyl chloride polymers. In addition, if desired, the phosphate compounds can replace a portion of the organometallic stabilizer compounds without significantly decreasing the degree of long-term heat stability imparted to a vinyl chloride containing polymer. In fact, the resultant combination of the two major constituents produces a stabilizer which displays improved effectiveness and greater stabilization than the initial organometallic stabilizer compound itself. It is, therefore, possible to significantly reduce the concentration of metal (i.e. tin) required to impart a given degree of stabilization utilizing a phosphate as described and, in fact, create a significant improvement in the overall stabilization.

As one example of this proposition, the present invention allows a reduction in the level of tin mercaptide heat stabilizer and this reduction in the level of tin mercaptide results in a product having improved resistance to weathering. allows a reduction in the level of tin mercaptide heat stabilizer and this reduction in the level of tin mercaptide results in a product having improved resistance to weathering.

Addition of various amounts of alkali-metal monohydrogen phosphate or pyrophosphate compounds to normal amounts of less effective tin stabilizer compounds, alone, provides even longer term stability for various extrusion or injection molding processes. Such additional amounts of alkali-metal monohydrogen or pyrophosphate compounds provide extended melt viscosity times of thermal stability for the vinyl halide polymers.

Finely-divided alkali-metal phosphate salts such as disodium monohydrogen phosphates, hydrous and anhydrous, potassium monohydrogen phosphate, and lithium dihydrogen phosphate, can all be used. Where a disodium monohydrogen phosphate is used it is preferred that it have a surface area above 0.5 $m^2/g$ and where a finely-divided alkali-metal pyrophosphate is used, it is preferred that it have a surface area above 1.1 $m^2/g$.

As indicated, the alkali-metal monohydrogen phosphate or pyrophosphate salts provide improved melt viscosity stability. This improvement means that a vinyl halide polymer composition can be held at elevated temperature for a longer period of time than was previously possible; it also means that the composition can be subjected to higher processing temperatures than were previously possible. Since the viscosity of a thermoplastic composition decreases as temperature is increased, higher melt temperatures allow faster processing and cycle times. Thus, the present invention provides greater productivity in injection molding and extrusion processes.

The present invention also provides significant economies in connect ion with recycling scrap generated in thermoplastics fabrication operations. Because scrap, e.g., runners and defective parts, have been exposed to elevated temperatures, there are limits respecting the amount of reground scrap that can be combined with virgin material; this figure is normally no greater than 20%. Because of the greater resistance to thermally-induced deterioration provided to vinyl halide resins by the alkali-metal phosphate salts described herein, the amount of recycled material can be 100%, i.e., defective parts, runners, flashing and the like can be reground and totally recycled for extrusion and injection molding.

Also contemplated is the use of alkaline earth metal phosphate salts and their pyrophosphate analogs. These compounds such as $Ca(H_2PO_4)_2$, $CaP_2O_7$, $Mg_3(PO_4)_2 \cdot 8H_2O$ and their hydrated or anhydrous analogs have been found to exhibit synergistic stabilized enhancement when added to select organometallic stabilizers. Applicant has tested, and the results of which are shown in the examples, the use of alkaline earth metal phosphates and they have been shown to exhibit desired results.

Suitable Polymer Substrates

More generally, the stabilizers are used with vinyl halide polymers, a term that includes vinyl halide homopolymers, vinyl halide copolymers and polymer blends containing said homopolymers or copolymers. As vinyl halide homopolymers, vinyl halide copolymers and polymer blends containing vinyl halide homopolymers or vinyl halide copolymers usable in the practice of this invention there may be used, for example, (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethyl-hexyl acrylate, butyl acrylate, ethyl acrylate and other alkyl acrylates, methyl methacrylate, ethyl methacrylate, butyl methacrylates, hydroxyethyl methacrylate and other alkyl methacrylates, methyl alpha chloroacrylate, styrene, vinyl ethers such as vinyl ethyl ether, vinyl chloroethyl ether, vinyl phenyl ether, vinyl ketones such as vinyl methyl ketone, vinyl phenyl ketone, 1 fluoro, 1-chloro-ethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer and polyvinyl chloride and polyethylene and polymethyl methacrylate. Typical vinyl halide copolyers usable in this invention include vinyl chloride-vinyl acetate, vinyl chloride-vinylidene chloride, vinyl chloridediethylfumarate, vinyl chloridetrichloroethylene and vinyl chloride-2 ethyl-hexyl acrylate. The polymer blends usable in the practice of this invention comprise physical blends of at least two distinct polymeric species and contain from 25 to 95 weight percent of vinyl halide homopolymer or vinyl halide copolymer. The vinyl halide copolymers usable in the practice of this invention are copolymers comprising from 25 to 95 mole percent vinyl halide units.

The benefits of this invention apply to both rigid and flexible vinyl halide polymers.

Amount of Stabilizer

The stabilizing compositions of this invention are usually employed in concentrations of between 0.1 and 20 parts by weight per 100 parts of vinyl chloride polymer. The composition of the co-stabilizer itself contains varying amounts by weight of the alkali-metal phosphate compound. Utilizing a compound such as anhydrous disodium monohydrogen phosphate, $(Na_2HPO)_4$, which is a solid throughout the process, and which has a surface area of no less than $0.5\ m^2/g$ creates a resultant enhanced stabilizer composition with the tin. Utilizing a disodium monohydrogen phosphate or the like having a surface area of $1.1\ m^2/g$ will result in significantly enhanced performance of the stabilizer, and surface area ranges above $1.1\ m^2/g$ will result in excellent and extremely enhanced term stability and melt viscosity of the stabilizer composition. The surface area correlation relates directly to the sites available for activity in the process. As a result, the present stabilizer composition imparts a longer useful life to heated polymer compositions than has heretofore been achieved using equivalent concentrations of conventional organotin stabilizers, based on the amount of tin present.

Differential scanning colorimetry (DSC) measures enthalpy changes as a function of temperature due to change of state, chemical composition or molecular activity. The endotherms exhibited by anhydrous disodium monohydrogen phosphate vary depending on the starting material and mode of drying. Temperatures to which a polyvinyl chloride formulation or the like run approximately 210° C. under shear. The alkali-metal monohydrogen phosphates which have transition temperatures above the polymer processing temperatures act as an extremely efficient synergistic stablilizing additive.

For many applications, a slight degree of discoloration may still exist, and such can be treated by the addition of a minor amount of a color additive which acts to boost and maintain color in the system.

Various color additives, such as alpha-phenyl indole; dihydropyridine; benzoyl stearyl methane, thiodiglycolbis-beta-aminocrotonate, hydrotalcite, magnesium aluminum hydroxy carbonates or hydroxymercaptans, or thioborate compounds of formula

R—B(SCH$_2$CH$_2$OH)$_2$ where R is alkyl such as isooctyl, are suitable to promote good color along with the synergistic co-stabilizer compounds.

Color additives, in general, are well known and are described as a booster for sulfur or mercaptan containing stabilizer compounds in the following U.S. patents, whose disclosures are incorporated herein by reference:

| | |
|---|---|
| 2,707,178 | Wilson |
| 2,954,362 | Wilson |
| 3,063,963 | Wooten et al |
| 3,067,166 | Zarensky |
| 3,167,527 | Hechenbleikner et al |
| 3,503,924 | Pollock |
| 3,928,285 | Gough |
| 4,360,619 | Kugele |
| 4,357,434 | Miyoshi et al. |

Additionally, organic thioanhydrides have been successfully used as a color additive and U.S. Pat. No. 3,822,233, Stapfer, which discloses and discusses same in incorporated by reference.

Terpenes, also used as a color additive, are disclosed in U.S. Pat. No. 3,242,133 and such disclosure is incorporated by reference.

One procedure for processing a vinyl halide stabilized polymer utilizes a Henschel blender and is as follows:

1. Charge the vinyl halide polymer resin to the mixer.
2. As soon as possible after starting mixing, add stabilizer to mixer.
3. Allow temperature to rise to 150° F.
4. Add lubricants, waxes, fillers. Allow temperature to rise to 210° F.
5. At 210° F., add TiO$_2$ (if called for in the formulation) and allow 30 seconds to mix.
6. Dump batch to Henschel cooler and allow to come to room temperature.

In the examples, the basic procedure for utilizing a Brabender device for the measurement of stability time, is as follows:

1. Clean and preheat Brabender to 205° C., set rotor speed to 60 RPM.
2. Add 62.0 grams of test PVC powder blend through powder charging chute; follow the charging piston and weight to force powder into rotors and facilitate fluxing (melting).
3. When torque curve indicates fluxing is complete, remove charging chute and weight and replace with "floating" weight.
4. At 1 minute, increase rotor speed until to 120 RPM.
5. Allow batch to mix until there is a clear upwards change in direction of the torque curve (at least 250 meter-grams).
6. Stop rotors, disassemble mixing head, remove hot batch from chamber, commence clean up procedure to prepare for next batch.

The following Examples demonstrate preferred embodiments of the invention and should not be interpreted as limiting the scope thereof. All parts and percentages are by weight, unless otherwise specified.

EXAMPLE 1

A thermoplastic composition comprising the following constituents:

| | Parts |
|---|---|
| Polyvinyl chloride polymer | 100.0 |
| Complex esters of fatty acids (lubricant) | 1.2 |
| Calcium stearate (lubricant) | 0.5 |
| Titanium dioxide (pigment) | 1.0 |

-continued

| | Parts |
|---|---|
| Calcium carbonate (filler) | 4.0 |

In this example, the rigid vinyl chloride polymer employed is sold under the trademark "GEON 86". The thermoplastic composition has added thereto a synergistic co-stabilizer composition comprising the following constituents:

| Run | Stabilizer |
|---|---|
| A. | 1.0 part STABILIZER A |
| B. | 1.0 part STABILIZER A + 2.0 parts $Na_2HPO_4.7H_2O$ |
| C. | 1.0 part STABILIZER A + 1.3 parts $Na_2HPO_4.2H_2O$ |

STABILIZER A = [80% BT1 + 20% solvent]
BT1 = [67% $Bu_2Sn(IOMA)_2$ + 27% $(BuSnS)_2S$ + 6% Mineral Oil]
(IOMA) = iso-octyl mercapto acetate RESULTS
Brabender Stability
T = 205° C. 60 RPM (1st minute)
increased to 120 RPM (to end)

| Run | Time (minutes) | Improvement (%) |
|---|---|---|
| A. | 11.0 | — |
| B. | 17.0 | 54.5 |
| C. | 12.1 | 10.0 |

The inorganic phosphate salts can be added as finely divided ground powders, or mixed with other solids or liquid additives. The compositions containing tin and inorganic phosphate are free flowing powders. Liquid tin compositions can be absorbed by the inorganic phosphate powder and such can be utilized or the inorganic phosphate can be slurried onto a filler and then dried and used as an additive. The inorganic phosphate salts of Example 1 contain a surface area of at least 1.1 $m^2/g$ after drying to the anhydrous form.

As can be seen from the results of the experiment, the addition of the inorganic phosphate salt in all cases lengthens to a significant degree the term stability of the polymer composition.

EXAMPLE 2

A thermoplastic composition comprising the following constituents:

| | Parts |
|---|---|
| Polyvinyl chloride polymer | 100.0 |
| Complex esters of fatty acids (lubricant) | 1.2 |
| Calcium stearate (lubricant) | 0.5 |
| Titanium dioxide (pigment) | 1.0 |
| Calcium carbonate (filler) | 4.0 |

In this example, the rigid vinyl chloride polymer employed is sold under the trademark "GEON 86". The thermoplastic composition has added thereto a synergistic co-stabilizer composition comprising the following constituents:

| Run | Stabilizer |
|---|---|
| A. | 1.0 part STABILIZER A |
| B. | 1.3 parts $K_2HPO_4$ + 1.0 part STABILIZER A |
| C. | 1.5 parts $Mg_3(PO_4).8H_2O$ + 1.0 part STABILIZER A |

STABILIZER A = [80% BT1 + 20% solvent]
BT1 = [67% $Bu_2Sn(IOMA)_2$ + 27% $(BuSnS)_2S$ + 6% Mineral Oil]

RESULTS
Brabender Stability
T = 205° C. 60 RPM (1st minute)
increased to 120 RPM (to end)

| Run | Time (minutes) | Improvement (%) |
|---|---|---|
| A. | 8.9 | — |
| B. | 14.3 | 60.7 |
| C. | 10.0 | 12.4 |

As can be seen from the results of the experiment, the addition of the inorganic phosphate salt in all cases lengthens to a significant degree the term stability of the polymer composition.

EXAMPLE 3

A thermoplastic composition comprising the following constituents:

| | Parts |
|---|---|
| Polyvinyl chloride polymer | 100.0 |
| Complex esters of fatty acids (lubricant) | 1.2 |
| Calcium stearate (lubricant) | 0.5 |
| Titanium dioxide (pigment) | 1.0 |
| Calcium carbonate (filler) | 4.0 |

In this example, the rigid vinyl chloride polymer employed is sold under the trademark "GEON 86". The thermoplastic composition has added thereto a synergistic co-stabilizer composition comprising the following constituents:

| Run | Stabilizer |
|---|---|
| A. | 1.0 part STABILIZER A |
| B. | .38 parts $LiH_2PO_4$ + 1.0 part STABILIZER A |
| C. | .69 parts $Mg(H_2PO_4)_2$ + 1.0 part STABILIZER A |

STABILIZER A = [80% BT1 + 20% solvent]
BT1 = [67% $Bu_2Sn(IOMA)_2$ + 27% $(BuSnS)_2S$ + 6% Mineral Oil]

RESULTS
Brabender Stability
T = 205° C. 60 RPM (1st minute)
increased to 120 RPM (to end)

| Run | Time (minutes) | Improvement (%) |
|---|---|---|
| A. | 10.2 | — |
| B. | 14.2 | 39.2 |
| C. | 11.3 | 8.8 |

As can be seen from the results of the experiment, the addition of the inorganic phosphate salt in all cases lengthens to a significant degree the term stability of the polymer composition.

EXAMPLE 4

A thermoplastic composition comprising the following constituents:

| | Parts |
|---|---|
| Polyvinyl chloride polymer | 100.0 |
| Complex esters of fatty acids (lubricant) | 1.2 |
| Calcium stearate (lubricant) | 0.5 |
| Titanium dioxide (pigment) | 1.0 |
| Calcium carbonate (filler) | 4.0 |

In this example, the rigid vinyl chloride polymer employed is sold under the trademark "GEON 86". The thermoplastic composition has added thereto a synergistic co-stabilizer composition comprising the following constituents:

| Run | Stabilizer |
|---|---|
| A. | .63 parts STABILIZER B |
| B. | .63 parts STABILIZER B + 2.0 parts $Na_2HPO_4.7H_2O$ |
| C. | .87 parts STABILIZER C |
| D. | .87 parts STABILIZER C + 2.0 parts $Na_2HPO_4.7H_2O$ |

STABILIZER B = 76% BuSn (S) ($SCH_2CH_2OH$)
+ 19% Solvent
+ 5% Mercapto ethyl ester of tall oil fatty acids

STABILIZER C =

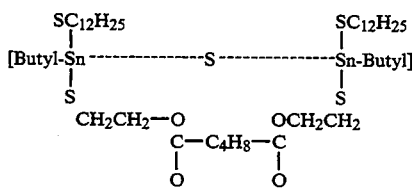

RESULTS
Brabender Stability
T = 205° C. 60 RPM (1st minute)
increased to 120 RPM (to end)

| Run | Time (minutes) | Improvement (%) |
|---|---|---|
| A. | 4.6 | — |
| B. | 9.9 | 115.2 |
| C. | 7.1 | — |
| D. | 14.1 | 98.6 |

As can be seen from the results of the experiment, the addition of the inorganic phosphate salt in all cases lengthens to a significant degree the term stability of the polymer composition.

EXAMPLE 5

A thermoplastic composition comprising the following constituents:

| | Parts | |
|---|---|---|
| Polyvinyl chloride polymer | 100.0 | |
| Impact modifier | 10.0 | |
| Processing aid | 1.0 | |
| Lubricant (2 types) | 1.5 | |
| Toner (pigment) | 0.05 | |
| Calcium stearate | 0.3 | |
| Zinc stearate | 0.2 | Stabilizer |
| Epoxidized soy oil | 3.0 | |

Each of the runs described below were done varying the particular color booster additive with and without (0.83 parts) $Na_2HPO_4$.(anhydrous) (DSP).

| | | Minutes | | Improvement |
|---|---|---|---|---|
| Run | Color Additive | No DSP | With DSP | (%) |
| 1 | (DLAD) | 3.8 | 6.5 | 71.1 |
| 2 | Benzoyl stearoyl methane | 6.5 | 15.6 | 140.0 |
| 3 | -Phenyl indole | 6.6 | 12.0 | 81.8 |
| 4 | Thiodiglycol-bis-beta-aminocrotonate | 5.0 | 9.5 | 90.0 |
| 5 | Alcamizer | 8.8 | 12.0 | 36.4 |
| 6 | -None- | 3.5 | 5.7 | 62.8 |

DLAD = (2,6-Dimethyl-3,5-Lauryl Acetate-Dihydropyridine)
Alcamizer = hydrotalcite; Magnesium-aluminum hydroxy carbonate In runs 1–4 there was used 0.15 PHR of color Additive. and in run 5 there was used 0.3 PHR of Color Additive As can be seen from the results of the experiment, the addition of the inorganic phosphate salt in all cases lengthens to a significant degree the term stability of the ploymer composition.

EXAMPLE 6

A thermoplastic composition comprising the following constituents:

| | Parts |
|---|---|
| Polyvinyl chloride polymer | 100.0 |
| Complex esters of fatty acids (lubricant) | 1.2 |
| Calcium stearate (lubricant) | 0.5 |
| Titanium dioxide (pigment) | 1.0 |
| Calcium carbonate (filler) | 4.0 | has added thereto the following stabilizers and/or co-stabilizers:

| Run | Stabilizer |
|---|---|
| A. | 1.05 parts BT1 |
| B. | 1.2 parts T2 |
| C. | .83 parts DSP + 1.2 parts T2 |
| D. | 1.3 parts T3 |
| E. | .83 parts DSP + 1.3 parts T3 |
| F. | .60 parts T4 |
| G. | .83 parts DSP + .60 parts T4 |
| H. | .81 parts Ester tin |
| I. | .83 parts DSP + .81 parts Ester tin |

RESULTS
Brabender Stability
T = 205° C. 60 RPM (1st minute)
increased to 120 RPM (to end)

| Run | Time (minutes) | Improvement (%) |
|---|---|---|
| A. | 7.2 | — |
| B. | 7.2 | — |
| C. | 10.3 | 43.1 |
| D. | 7.7 | — |
| E. | 10.7 | 39.0 |
| F. | 3.5 | — |
| G. | 4.0 | 14.3 |
| H. | 6.3 | — |
| I. | 9.5 | 49.2 |

DSP = $Na_2HPO_4$.(anhydrous)
BT1 = [25% Methyltin $(IOMA)_3$ + 75% Dimethyltin $(IOMA)_2$]
T2 = [$(C_8H_{17})_2Sn(SCH_2COOC_8H_{17})_2$]
T3 = 73% [$(C_8H_{17})_2Sn(SCH_2COOC_8H_{17})_2$]
27% [$(C_8H_{17})Sn(SCH_2COOC_8H_{17})_3$]
T4 = [$(C_4H_9)_2Sn(OOCC_{11}H_{23})_2$]
Ester tin = $(C_4H_9OOCCH_2CH_2)_2Sn(SCH_2COOC_8H_{17})_2$ As can be seen from the results of the experiment, the addition of the inorganic phosphate salt in all cases lengthens to a significant degree the term stability of the polymer composition.

EXAMPLE 7

A thermoplastic composition comprising the following constituents:

| | Parts |
|---|---|
| Polyvinyl chloride polymer | 100.0 |
| Impact modifier | 5.0 |
| Processing aid | 1.0 |
| Lubricant (2 types) | 0.63 |
| Stearamide wax | 0.75 | has added thereto the following stabilizers and/or co-stabilizers:

| Run | Stabilizer |
|---|---|
| A. | 2.5 parts T5 |
| B. | 2.5 parts T5 + 1.0 parts Na₂HPO₄ |
| C. | 2.5 parts T6 |
| D. | 2.5 parts T6 + 1.0 parts Na₂HPO₄ |
| E. | 2.5 parts T4 |
| F. | 2.5 parts T4 + 1.0 parts Na₂HPO₄ |

RESULTS
Brabender stability
T = 190° C. 75 RPM

| Run | Time (minutes) | Improvement (%) |
|---|---|---|
| A. | 13.2 | — |
| B. | 17.8 | 34.8 |
| C. | 11.6 | — |
| D. | 17.4 | 50.0 |
| E. | 5.9 | — |
| F. | 10.8 | 83.1 |

T5 = dibutyl Sn bis(iso-octylmercapto acetate (IOMA))
T6 = 60.8% dibutyl Sn bis stearylmaleate
36.3% dibutyl Sn maleate
2.9% anti-oxidant
T4 = dibutyl Sn dilaurate As can be seen from the results of the experiment, the addition of the inorganic phosphate salt in all cases lengthens by a significant degree the term stability of the polymer composition. The surface area of the Na₂HPO₄ used in Example 7 was 1.29 m²/g.

EXAMPLE 8

A thermoplastic composition comprising the following constituents:

|  | Parts |
|---|---|
| Polyvinyl chloride polymer | 100.0 |
| Impact modifier | 5.0 |
| Paraffin wax | 0.8 |
| Processing aid | 1.0 |
| Lubricant | 2.0 |
| Titanium dioxide (pigment) | 12.0 | has added thereto the following stabilizers and/or co-stabilizers:

| Run | Stability |
|---|---|
| A. | 2.5 parts T6 |
| B. | 2.5 parts T6 + 1.0 parts Na₂HPO₄ (1.74 m²/g) |
| C. | 2.5 parts T4 |
| D. | 2.5 parts T4 + 1.0 parts Na₂HPO₄ (1.29 m²/g) |

RESULTS
Brabender stability
T = 190° C. 75 RPM

| Run | Time (minutes) | Improvement (%) |
|---|---|---|
| A. | 12.9 | — |
| B. | 16.0 | 24.0 |
| C. | 14.6 | — |
| D. | 20.6 | 47.6 |

T6 = 60.8% dibutyl Sn bis stearylmaleate
36.3% dibutyl Sn maleate
2.9% anti-oxidant
T4 = dibutyl Sn dilaurate As can be seen from the results of the experiment, the addition of the inorganic phosphate salt in all cases lengthens to a significant degree the term stability of the polymer composition.

EXAMPLE 9

A thermoplastic composition comprising the following constituents:

|  | Parts |
|---|---|
| Polyvinyl chloride polymer | 100.0 |
| Titanium dioxide (pigment) | 12.0 |
| Impact modifier | 5.0 |
| Paraffix wax | 0.8 |
| Processing aid | 1.0 |
| Calcium stearate | 2.0 |
| Thioextender (thioborate) | 0.1 | has added thereto the following stabilizers and/or co-stabilizers:

| Run | Stabilizer |
|---|---|
| A. | 0.8 parts T2 |
| B. | 0.8 parts T2 + 0.8 parts Na₂HPO₄ |
| C. | 1.0 parts T7 |
| D. | 1.0 parts T7 + 0.8 parts Na₂HPO₄ |

T2 = dioctyl Sn bis(IOMA)

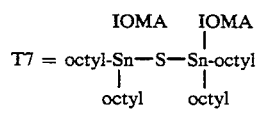

$$T7 = \text{octyl-Sn—S—Sn-octyl with IOMA and octyl substituents}$$

RESULTS
Brabender stability
T = 190° C. 75 RPM

| Run | Time (minutes) | Improvement (%) |
|---|---|---|
| A. | 11.3 | — |
| B. | 13.7 | 21.1 |
| C. | 14.1 | — |
| D. | 18.4 | 30.5 |

As can be seen from the results of the experiment, the addition of the inorganic phosphate salt in all cases lengthens to a significant degree the term stability of the polymer composition. The surface area for the Na₂HPO₄ used in Example 9 was 1.76 m²/g.

EXAMPLE 10

Tin tetramercaptides with inorganic phosphates as thermal stabilizers for vinyl chloride polymer compositions.

The use of tin tetramercaptides as thermal stabilizers in PVC has resulted in catastrophic degradation of the polymer due to rapid formation of tin chloride prodegradants. It has been found that certain alkali metal phosphate salts can dramatically improve stability of tin tetramercaptide stabilized polyvinyl chloride. The addition of Na₂HPO₄.7H₂O (2 PHR) boosted the process stability time of Sn(IOMA)₄ 1.9 PHR from 5 minutes to 20.2 minutes. Further enhancement to color and term stability can be achieved by the use of a color additive. Certain dibasic phosphate salts, when added to the vinyl chloride polymer formulations containing tin tetramercaptides as initial stabilizer, showed surprising improvements to color and process stability. Such phosphate salts include Na₂HPO₂. .12H₂O, Na₂HPO₄.7H₂O (anhydrous) and K₂HPO₄. The results were unexpected, as neither the tin tetramercaptide nor the alkali metal phosphate salts themselves showed any stabilizing properties. The results showing these dramatic improvements are summarized in Tables I and II below. The following formulation is used in all Examples:

| PVC 103 EP | 100 |
|---|---|
| TiO2 | 12 |
| D 200* | 5 |
| Process Aid** | 0.3 |
| Ca Stearate | 2 |
| Paraffin Wax | 1.0 |

*An impact modifier sold by M&T Chemicals Inc. under the trademark Durastrength D-200.
**A processing aid sold by Metco America Inc. under the trademark Metablen P-551 has added thereto a stabilizer or co-stabilizer composition:

TABLE I

| RUN | PARTS | Stabilizer | Stability Time (mins) |
|---|---|---|---|
| 1 | — | None | 9.6 |
| 2 | 1.3 | Bu2Sn(IOMA)2 | 19.1 |
| 3 | 1.6 | BuSn(IOMA)3 | 21.4 |
| 4 | 1.5 | BuSn(IOMA)3 | 22.6 |
| 5 | 1.9 | Sn(IOMA)4 | 5.0 |
| 6 | 1.9<br>2.0 | Sn(IOMA)4 +<br>Na2HPO4.7H2O | 20.2 |
| 7 | 1.9<br>2.5 | Sn(IOMA)4 +<br>Na2HPO4.7H2O | 19.9 |
| 8 | 1.5<br>2.0 | Sn(IOMA)4 +<br>Na2HPO4.7H2O | 21.0 |
| 9 | 1.9 | Sn(DDM)4 | 7.2 |
| 10 | 1.9<br>2.0 | Sn(DDM)4 +<br>Na2HPO4.7H2O | 18.5 |
| 11 | 2.0 | Na2HPO4.7H2O | 8.9 |
| 12 | 1.9<br>2.0<br>1.0 | Sn(IOMA)4 +<br>Na2HPO4.7H2O<br>2-MES | 23.1 |
| 13 | 1.9<br>2.0<br>1.0 | Sn(IOMA)4 +<br>Na2HPO4.7H2O +<br>IOMA | 27.7 |

2 - MES - mercapto ethyl stearate
(DDM) - dodecyl mercaptan

Table II describes the improvement to color by the dibasic metal phosphate. The tests are as described in Table II except that samples are withdrawn from the Brabender at 2 min time intervals. The colors are compared visually and rated according to the following abbreviations:

| Color | Degree |
|---|---|
| W—white | L—light |
| Y—yellow | P—pale |
| Pk—pink | D—dark |
| G—gray | |

TABLE II

| RUN | Parts | Stabilizer | 4 | 8 | 12 | 16 | 20 | 24 |
|---|---|---|---|---|---|---|---|---|
| 14 | — | None | DY | G | | | | |
| 15 | 1.9 | Sn(IOMA)4 | G | | | | | |
| 16 | 1.9<br>2.0 | Sn(IOMA)4 +<br>Na2HPO4.7H2O | W | W | LY | PY | G | |
| 17 | 1.9<br>2.0<br>1.0 | Sn(IOMA)4<br>Na2HPO4.7H2O<br>2-MET | W | W | W | PW | LY | DY |
| 18 | 1.9<br>2.0 | Sn(IOMA)4<br>K2HPO4 | W | W | DY | G | | |
| 19 | 2.0 | Na2HPO4.7H2O | Y | G | | | | |

2 - MET = mercapto ethyl tallate

The results demonstrate the unexpected synergistic effect resulting from the combination of tin and tetramercaptides and alkali metal phosphate salts. Further improvement is achieved by the addition of color additives (2-MET, IOMA). The prior art does not teach any combination of tin tetramercaptide and an alkali metal phosphate. The results, again, show significant improvement in the overall term stability.

EXAMPLE 11

A thermoplastic composition comprising the following constituents:

| | Parts |
|---|---|
| Polyvinyl chloride polymer | 100.0 |
| Titanium dioxide (pigment) | 12.0 |
| Impact modifier | 5.0 |
| Paraffin wax | 0.8 |
| Processing aid | 1.0 |
| Calcium stearate (lubricant) | 2.0 |
| Thioextender (color booster) | 0.1 | has added thereto the following stabilizers and/or co-stabilizers:

| Run | Stabilizer |
|---|---|
| A. | 1.2 parts Sn(IOMA)4 |
| B. | 1.2 parts Sn(IOMA)4 + 0.8 parts Na2HPO4 |
| C. | 0.9 parts Sn(IOMA)4 |
| D. | 0.9 parts Sn(IOMA)4 + 0.8 parts Na2HPO4 |

RESULTS
Brabender stability
T = 190° C.    75 RPM

| Run | Time (minutes) | Improvement (%) |
|---|---|---|
| A. | 5.3 | — |
| B. | 9.4 | 77.4 |
| C. | 4.2 | — |
| D. | 7.8 | 85.7 |

As can be seen from the results of the experiment, the addition of the inorganic phosphate salt in all cases lengthens to a significant degree the term stability of the polymer composition. The surface area of the Na2HPO4 used in Example 11 was 1.76 m$^2$/g.

EXAMPLE 12

The synergist effect of disodium phosphate is seen when Sn chlorides are included in the stabilizer mixture as the examples below indicate.

The formulation used is:

| PVC | 100 |
|---|---|
| TiO2 | 12 |
| Impact Modifier | 5 |
| Process Aid | 1 |
| Ca Stearate | 2 |
| Paraffin Wax | 0.2 |

-continued

| Stabilizer | | X | |
|---|---|---|---|
| Stabilizer | Parts | % Sn in Stabilizer | Melt Stability Time |
| 1. a. BuSn (S) IOMA | 0.46 | 13 | 14.8 |
| b. BuSn (S) IOMA + | 0.46 | 13 | 20.8 |
| Na$_2$HPO$_4$ | 0.8 | | |
| c. BuSn (S) IOMA + | 0.41 | 12 | |
| BuSnCl$_3$ | 0.03 | 1 | 14.6 |
| d. BuSn (S) IOMA + | 0.41 | 12 | |
| BuSnCl$_3$ + | 0.03 | 1 | |
| Na$_2$ HPO$_4$ | 0.8 | | 20.8 |
| 2. a. SnCl (IOMA)$_3$ | 1.6 | 24 | 2.9 |
| b. SnCl (IOMA)$_3$ + | 1.6 | 24 | |
| Na$_2$HPO$_4$ | 2.0 | | 14.2 |
| c. SnCl (IOMA)$_3$ + | 1.6 | 24 | |
| isooctylmercaptoacetate | 0.4 | | |
| Na$_2$HPO$_4$.7H$_2$O | 2.0 | | 16.4 |

EXAMPLE 13

Improved performance with Na$_2$HPO$_4$ is also observed if the stabilizer is a mixture of Sn chloride and free mercaptan. The formulation used is:

| PVC | 100 |
|---|---|
| Lubricant | 1.5 |
| Ca Stearate | 0.3 |
| Stabilizer | X |

| Stabilizer | Parts | % Sn in Stabilizer | Time to Degradation |
|---|---|---|---|
| a. BuSnCl$_3$ | 0.18 | 7.4 | |
| IOMA | 0.38 | | 4 Mins. |
| b. BuSnCl$_3$ | 0.18 | 7.4 | |
| IOMA | 0.38 | | |
| Na$_2$HPO$_4$.7H$_2$O | 0.4 | | 14 Mins. |

The combination of monobutyltin trichloride and IOMA, not generally regarded as an effective stabilizing combination can be rendered surprisingly effective by the addition of a phosphate salt in accordance with this invention.

EXAMPLE 14

A thermoplastic composition comprising the following constituents:

| | Parts |
|---|---|
| Polyvinyl chloride polymer | 100.0 |
| Titanium dioxide | 12.0 |
| Calcium carbonate | 4.0 |
| Calcium stearate | 0.4 |
| Lubricant | 0.8 | has added thereto the following stabilizers and/or co-stabilizers.

| Run | Stabilizer |
|---|---|
| A | 0.26 parts Sb (IOMA)$_3$ |
| B | 0.26 parts Sb (IOMA)$_3$ + 0.53 parts Na$_2$HPO$_4$.7H$_2$O (dried) |

| Results | | |
|---|---|---|
| Brabender Stability T = 190° F. 75 RPM | | |
| Run | Time (minutes) | Improvement (%) |
| A | 7.8 | — |
| B | 11.0 | 41.0 |

As can be seen from the results of the experiment, the addition of dried disodium monohydrogen phosphate heptahydrate provides a 41% improvement in melt stability time.

The results, as can be seen from the above Examples, show improved stabilization of the vinyl resin compound. The utilization of the alkali-metal phosphate, such as the disodium hydrogen phosphate, allows for a synergistic-type effect in the overall stabilization properties of the stabilizer composition. In addition the replacement of the metal by the inorganic phosphate yields enormous economic savings to the user. It is contemplated that such inorganic additive can be utilized in all conceivable metal stabilizing compositions.

A further novel phenomenum has been discovered which follows the concept of high stabilizer area and being a direct correlation to enhance melt stability times.

Disodium monohydrogen phosphate (anhydrous) with low surface area (below 0.5 m$^2$/g) does not exhibit synergistic behavior with tin mercaptides. It has been found to be possible to increase the surface area of the phosphate by hydration and subsequent dehydration.

Forty grams of disodium monohydrogen phosphate (SA=0.47 m$^2$/g) was slurried with 66.6 mls. H$_2$O to form a 60% solution of disodium monohydrogen phosphate in water. The slurry was rapidly stirred for 20 minutes and subsequently stripped by water by roto evaporation. The conditions for H$_2$O removal were:

(I) at 25° and 25 tort Hg for 40 minutes (II) temperature raised to 71° C. and 25 torr Hg for 240 minutes The contents of the flask was tumbled very slowly during the drying operation. The resulting Na$_2$HPO$_4$ had a surface area of 2.2 m$^2$/g.

Performance evaluation of this phosphate was completed in the following formulation:

| | Parts |
|---|---|
| PVC | 100.0 |
| Esters of fatty acids | 1.5 |
| Calcium stearate | 0.3 |
| Titanium dioxide | 1.0 |
| Calcium carbonate | 3.0 |

The test was conducted under the following Brabender conditions:

T=205° C., 60 RPM (1st minute) increased to 120 RPM (to end)

| Run | Stabilizers |
|---|---|
| A | 0.7 organotin (alone) |
| B | 0.7 organotin + 0.8 Na$_2$HPO$_4$ (before hydration/dehydration) S.A. = 0.47 m$^2$/g |
| C | 0.7 + 0.8 Na$_2$HPO$_4$ (after hydration/dehydration) S.A. = 2.2 m$^2$/g |

| | Results | |
|---|---|---|
| Run | Melt Stability time (time) | (%) Improvement |
| A | 8.8 | — |
| B | 9.3 | — |
| C | 14.3 | 53.8% |

As a result one can see that the synergistic stabilizer of the present invention, having high surface areas whether present initially or created through hydration/dehydration exhibit outstanding results.

The overall stabilizer composition combining metals and alkali metal phosphate can be utilized to stabilize a numerous and almost never-ending amount of resin components.

What is claimed is:

1. A stabilized thermoplastic resin composition for injection molding and extrusion processes, characterized in that the resin comprises 0 to 100% recycled poly(vinyl chloride) resin exhibiting improved time and temperature processing latitude as well as long term stability via a synergistic combination of:
   (a) an organotin stabilizer, and
   (b) 0.1 to 20 parts per 100 parts by weight resin of a free flowing powder of an alkali metal hydrogen phosphate or pyrophosphate salt with a B.E.T. measured surface area of at least 0.5 m² g.

2. The composition of claim 1 where the salt is an alkali metal hydrogen phosphate.

3. The composition of claim 2 where the alkali metal hydrogen phosphate is disodium monohydrogen phosphate.

4. The composition of claim 3 where the disodium monohydrogen phosphate is one or more of $Na_2HPO_4$ (anhydrous), $Na_2HPO_4.2H_2O$, $Na_2HPO_4.7H_2O$, and $Na_2HPO_4.12H_2O$.

5. The composition of claim 1 where the alkali metal hydrogen phosphate has a B.E.T. measured surface area of at least 1.1. m² g.

6. The composition of claim 5 where the alkali metal hydrogen phosphate is disodium monohydrogen phosphate with a B.E.T. measured surface area greater than 1.2 m² g.

7. The composition of claim 6 where the disodium monohydrogen phosphate has a B.E.T. measured surface area greater than 2.0 m² g.

8. The composition of claim 1 where the organotin stabilizer is an organotin compound containing one or more tetravalent tin atoms which each have at least one direct tin to carbon bond.

9. The composition of claim 1 where the organotin compound comprises an organotin oxide, sulfide, alkoxide carboxylate, mercaptide, derivative of a mercapto acid ester or derivative of a mercapto alcohol ester.

10. The composition of claim 1 where the organotin compound is a methyltin mercaptide, butyltin mercaptide, octyltin mercaptide, ester tin mercaptide, or non-alkylated tin mercaptide.

11. The composition of claim 1 where the organotin compound is a sulfide bridged tin mercaptide, oxygen bridged tin mercaptide, or halogen containing bridged tin mercaptide.

12. The composition of claim 1 where the organotin compound is tin carboxylate, tin maleate or tin alkoxide.

13. The composition of claim 3 further comprising a color booster additive.

14. The composition of claim 13 further comprising a lubricant.

15. The composition of claim 14 further comprising a filler material.

16. The composition of claim 15 further comprising a pigment material.

17. The composition of claim 16 further comprising an impact modifier.

18. The composition of claim 17 comprising a butyltin stabilizer and disodium monohydrogen phosphate with a B.E.T. measured surface area of at least 1.1 m²g.

19. The composition of claim 18 where the disodium monohydrogen phosphate has a B.E.T. measured surface area of at least 2.0 m²g.

20. A process for stabilizing poly(vinyl chloride) resin with the steps:

(1) hydrating and dehydrating a salt selected from the group of sodium or potassium monohydrogen phosphate, lithium phosphate or alkali metal pyrophosphate to produce a free flowing powder with a B.E.T. measured surface area of at least 0.5 m²g;

(2) adding at least one part tin stabilizer and at least one part powder or mixture thereof to 100 parts poly (vinyl chloride) resin; and (3) injection molding or extruding the stabilized poly(vinyl chloride) resin to produce a shaped article.

21. The process of claim 20 wherein in step (2) the mixture is added at a temperature between 150° F. and 210° F.

22. The process of claim 21 wherein in step (2) sodium monohydrogen phosphate with a B.E.T. measured surface area of at least 1.1 m²g is added as a powder.

23. The process of claim 22 wherein in step (2) sodium monohydrogen phosphate with a B.E.T. measured surface area of at least 1.1 m²g is added as a mixture with liquid stabilizer.

24. The process of claim 21 where the tin stabilizer comprises a methyltin mercaptide, butyltin mercaptide, octyltin mercaptide, ester tin mercaptide, or non-alkylated tin mercaptide.

25. The process of claim 21 wherein the tin stabilizer is tin chloride, tin carboxylate, tin maleate or tin alkoxide.

26. The process of claim 21 wherein the tin stabilizer is a butyltin stabilizer and the powder is disodium monohydrogen phosphate.

27. The process of claim 21 wherein the tin stabilizer is tin chloride or a tin chloride/tin mercaptide combination.

28. The process of claim 21 wherein the powder is disodium monohydrogen phosphate.

29. A process for preparing a stabilized thermoplastic polymer composition comprising the steps:

(1) adding a hydrated salt selected from the group of disodium monohydrogen phosphate, dipotassium monohydrogen phosphate, lithium phosphate or alkali metal pyrophosphate to a roto evaporation apparatus;

(2) dehydrating under vacuum to produce a free flowing powder with a B.E.T. measured surface area of at least 0.5 m²g;

(3) adding the powder and organotin stabilizer to at least one halogen-containing thermoplastic polymer at a temperature between 150° F. and 210° F.; and (4) fabricating a pipe or bottle or siding material or window profile or sheet or film comprising 0 to 100% recycled poly(vinyl chloride).

30. The process of claim 29 where the thermoplastic polymer is poly(vinyl chloride).

31. The process of claim 30 further comprising one or more of color booster additive, lubricant, pigment, impact modifier and filler.

32. The process of claim 31 where the powder is disodium monohydrogen phosphate with a B.E.T. measured surface area of greater than 1.2 m²g.

33. The process of claim 30 where the organotin stabilizer is a butyltin stabilizer.

34. The process of claim 30 where the powder is $LiH_2PO_4$.

35. The process of claim 32 where in step (2) a vacuum of about 25 mm Hg is used at about 25° C.

* * * * *